Figure 6:
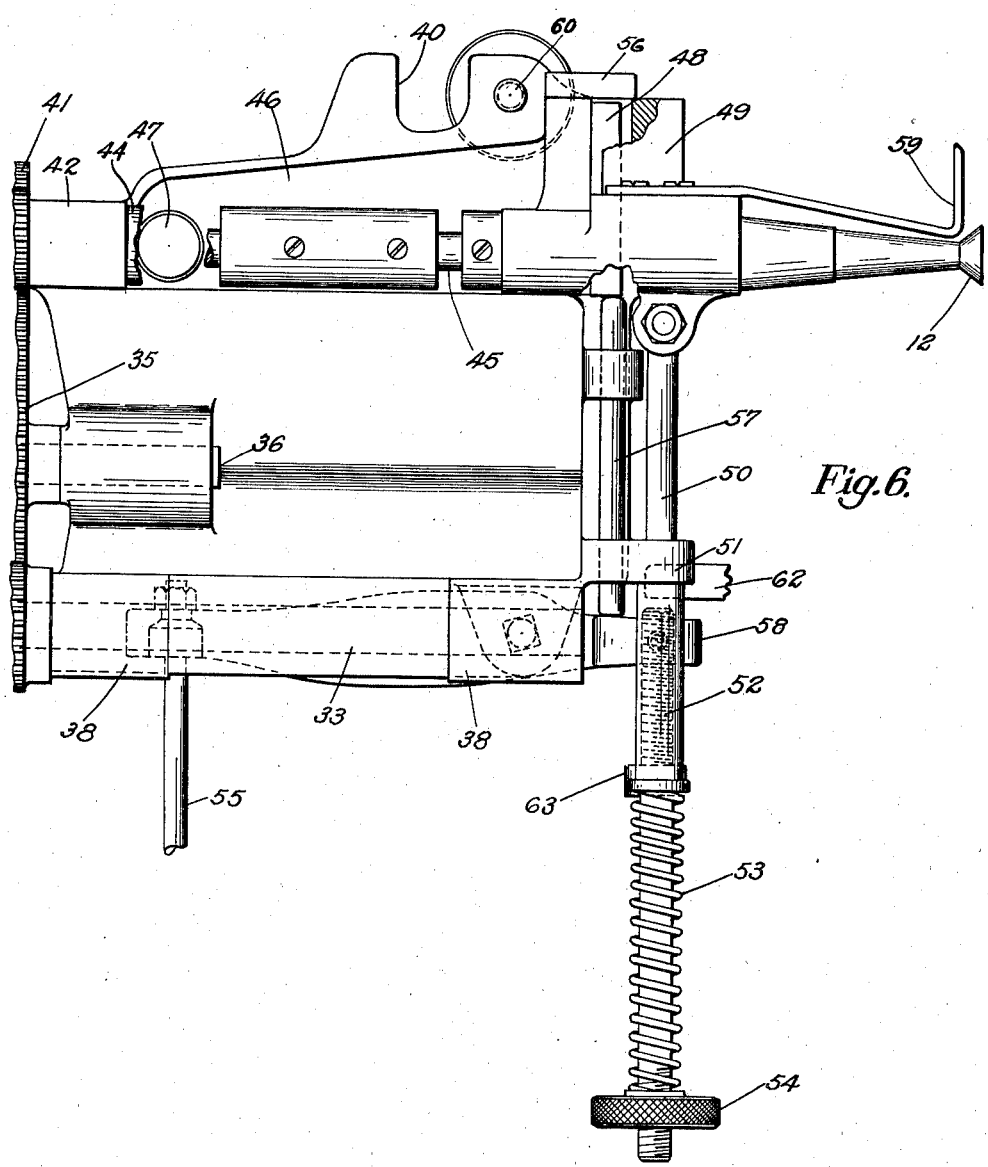

July 2, 1940.  A. R. RIDDERSTROM  2,206,855
LIP-SETTING AND TRIMMING MACHINE
Filed Sept. 9, 1937  3 Sheets-Sheet 1
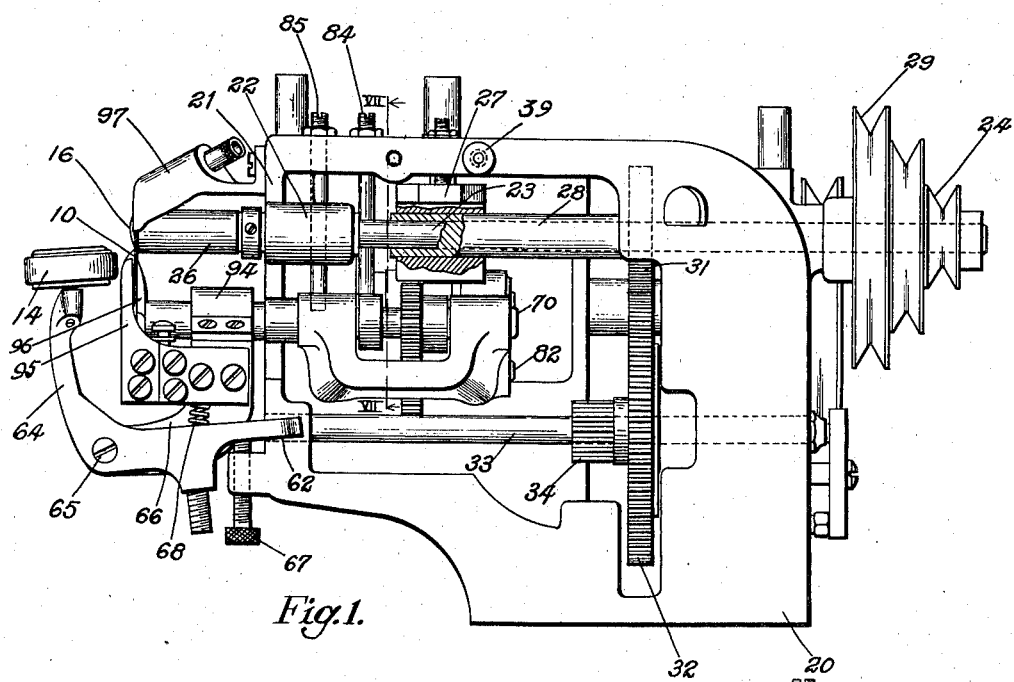
Fig. 1.
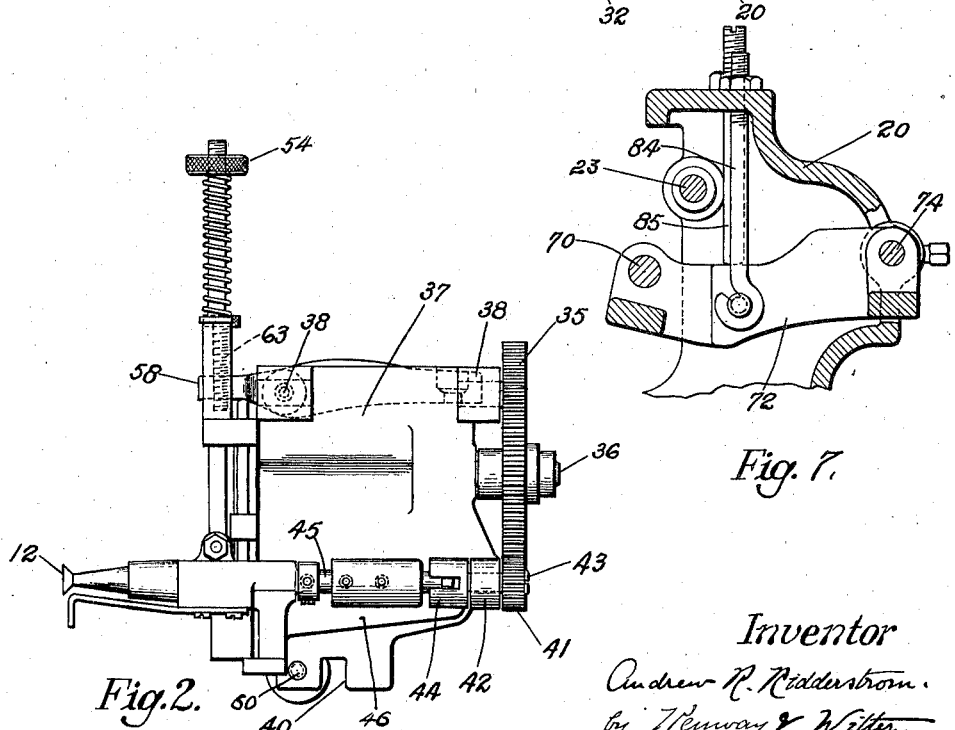
Fig. 2.
Fig. 7.
Inventor
Andrew R. Ridderstrom.
by Kenway & Witter
Attys.

July 2, 1940.  A. R. RIDDERSTROM  2,206,855
LIP-SETTING AND TRIMMING MACHINE
Filed Sept. 9, 1937  3 Sheets-Sheet 2
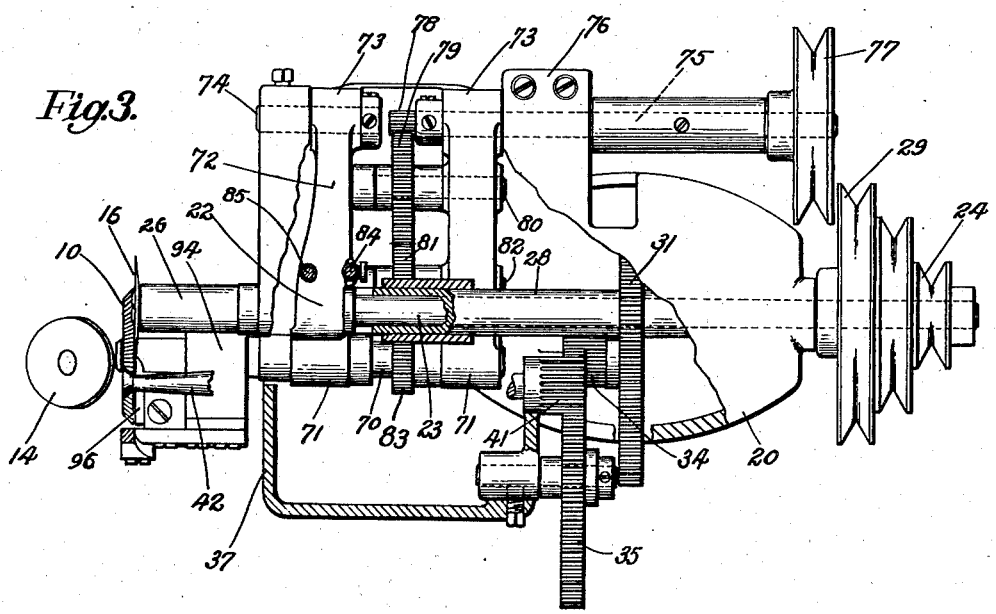
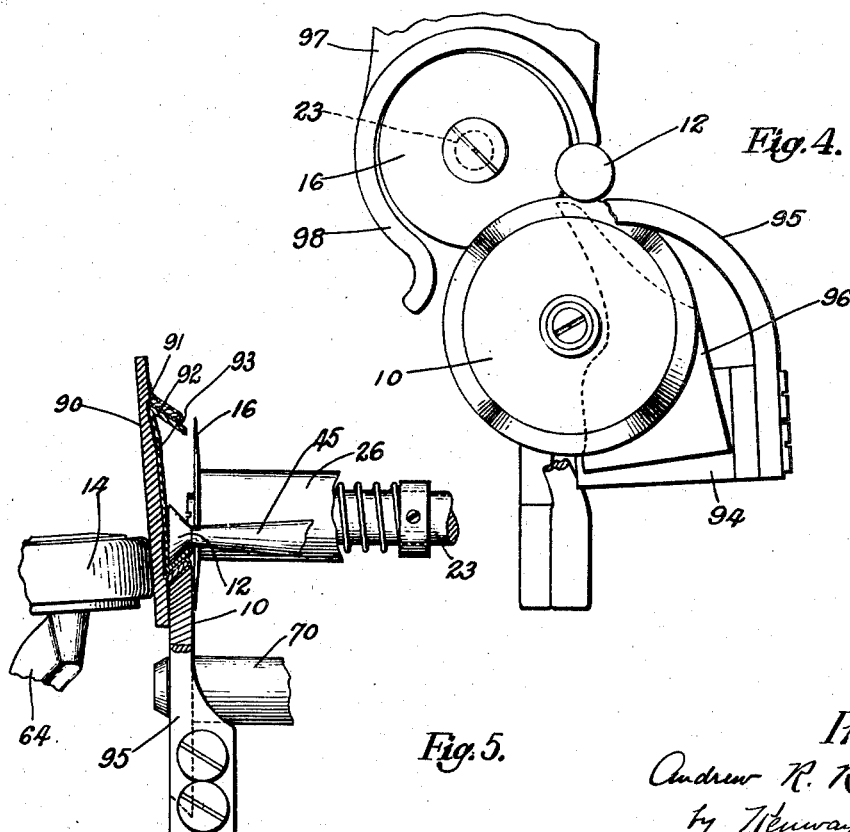
Inventor
Andrew R. Ridderstrom
by Henway & Witter
Attys.

Patented July 2, 1940

2,206,855

UNITED STATES PATENT OFFICE 2,206,855

LIP-SETTING AND TRIMMING MACHINE

Andrew R. Ridderstrom, Nahant, Mass., assignor to Prime Manufacturing Company, Lynn, Mass., a corporation of Massachusetts Application September 9, 1937, Serial No. 163,043

11 Claims. (Cl. 12—20)

This invention relates to the manufacture of ribbed insoles and consists in an improved machine for laying a reenforcing sheet or ply upon one face of the insole, shaping it accurately to the contour of the rib and trimming the surplus flush with the edge of the rib or in any other desired relation to the rib.

An important field of use for the machine of my invention is in manufacturing insoles having a rib which is cemented or otherwise secured to the flat surface of an unchanneled sole blank. The invention will be described for purposes of illustration in this connection although it will be understood that it may be employed for reenforcing channeled or shouldered insoles and, in fact, in any field where it is desired to shape or trim an adhesive or cemented reenforcing sheet. The general object of the invention is to provide a machine of this character which may be operated successfully at high speed for accurately shaping the reenforcing material to the contour of a rib and for shaping the reenforced rib, which is efficient in its trimming function, as well as convenient and safe for the operator. I contemplate, moreover, a machine organized to feed the insole automatically, or practically automatically, so that the operator is called upon to do very little beyond initially placing the work in the machine.

To these ends, an important feature of the invention consists in inside and outside rib-shaping rolls and a rotary trimming knife arranged to cooperate in their action upon the rib and the reenforcing sheet and each driven by an independent train at the rate of speed best adapted for its function. As herein shown, the knife shaft is independently driven and carries a concentric hollow shaft constituting a part of the driving train to one of the rib-shaping rolls. This is a compact and desirable mechanical construction which facilitates locating the operative instrumentalities of the machine in the close relationship which it is necessary for them to occupy.

As herein shown the cooperating rib-shaping rolls are provided with flat end faces for engaging the surface of the insole upon both sides of the rib, and one of these rolls provides a flat gauging face against which a rotary knife disk is yieldingly maintained. In this way, the height of the flange of the reenforcing material upon the rib is accurately gauged throughout the travel of the insole through the machine.

In the machine herein shown each of the rib-shaping rolls is driven by an independent gear train at exactly the speed best suited for its function in the machine. This arrangement facilitates the employment of separate driving pulleys for the knife and for the rib-shaping rolls and these pulleys may be belted to the transmission equipment provided in all shoe factories. The outside rib-engaging roll as herein shown may advantageously be mounted in an adjustable rocker member in which is also carried a part of the gear train for the roll. The inside rib-engaging roll may similarly be mounted in an auxiliary frame with provision for adjustment, and in this case too the driving train may be carried in part by the auxiliary frame.

These and other features of the invention will be best understood and appreciated from the following description of a preferred embodiment thereof selected for purposes of illustration and shown in the accompanying drawings in which, Fig. 1 is a view of the machine in side elevation with the side frame removed and certain portions broken away, Fig. 2 is a view in elevation of the side frame and the parts mounted thereon shown in an inverted position, Fig. 3 is a plan view of the machine partly in section, Fig. 4 is a front end view on a larger scale of the operating instrumentalities of the machine, Fig. 5 is a similar view of the same instrumentalities in side elevation, partly in section, and Fig. 6 is a view in elevaton of the side frame and associated parts as seen from inside the machine.

Fig. 7 is a fragmentary sectional view on the line VII—VII of Fig. 1.

Before describing the construction of the machine it will be convenient to refer briefly to one type of insole in the manufacture of which the machine is particularly useful. This insole, as indicated in Fig. 5 comprises a flat sole blank 90 which need not be more than four or five irons in thickness. To this is adhesively secured a rib comprising a textile cover 91 and a core 92 of any suitable tough fibrous material. The cover and core of the rib are preferably firmly and continuously united by cement or other adhesive in the rib-laying operation. It is desired to reinforce the rib, and sometimes the whole insole, by adhesively securing a sheet of reinforcing fabric such as duck to the inner face of the insole and the inner face of the rib, tucking the duck 93 accurately and securely into the vertex of the rib, and trimming the surplus material flush with the upper edge of the rib. The function of the present machine is to perform these operations upon the reinforcing sheet, and, at the same time, to compact and shape the rib so that it is slightly inwardly inclined, thus facilitating the subsequent welt sewing operation and assisting the operator to strike the root of the rib with the needle of the machine.

The operative instrumentalities of the machine comprise a large roll 10 having a bevelled corrugated edge and being mounted upon a normally stationary but vertically adjustable horizontal shaft, and designed to engage and form the outside of the insole rib as best shown in Fig. 5; a small bevel edge roll 12 mounted on the end of a horizontal shaft arranged to swing bodily up and down and adapted for forming the inside surface of the insole rib and tucking the reinforcing insole fabric into the vertex; an external presser roll 14 mounted on a substantially vertical axis and arranged to engage the outer face of the insole, and; the rotary disk knife 16 which is arranged to trim the reinforcing material flush with the outer edge of the insole rib.

The machine comprises a main frame 20 which ordinarily has a base not herein shown, and an overhanging portion in which the instrumentalities above described are mounted. The frame is generally hollow and has a flat front plate 21 formed integral therewith. Projecting inwardly from the front plate is a boss 22 which furnishes the forward bearing for the horizontal knife shaft 23. The rear bearing for the knife shaft is formed in the main portion of the frame 20, and the shaft is provided at its outer end with a small pulley 24 by which the shaft and the knife disk 16 may be driven at a high rate of speed. The knife shaft is mounted for rotation about a fixed axis independently of all other portions of the machine and the pulley 24 is driven by a separate belt at the speed best suited for the cutting function of the knife disk 16. The knife disk 16 is carried on the forward end of the shaft 23 by an elongated sleeve 26 which is free to move longitudinally upon the shaft and contains a compression spring tending always to move the knife 16 outwardly into engagement with the inner face of the outside roll 10.

Within the frame 20 and projecting downwardly from the upper portion thereof is a bearing block 27 which constitutes the forward bearing for a hollow shaft 28 arranged concentrically with and upon the knife shaft 23 already described. The hollow shaft 28 has a rear bearing in the main frame 20 and is provided at its rear end with a two-step pulley 29 by which it is driven independently of the knife shaft. Fast to the hollow shaft 28 is a pinion 31 and this is arranged to mesh with a large pinion 32 loose upon a shaft 33 provided with bearings in the frame 20 below those for the hollow shaft 28. The large pinion 32 is formed integral with, or otherwise rigidly attached to, a small pinion 34 forming a part of the gear train for driving the small inside roll 12. The remaining gears in this train and the roll itself are mounted in an auxiliary side frame 37 provided with perforated bosses 38 arranged to fit upon and swing on the stationary shaft 33. The auxiliary frame 37 completes the general contour of the main frame 20 of the machine and is arranged to be held in its closed position by an adjustable clamping screw 39 set in the upper portion of the frame 20, and arranged to pass through a slot 40 formed in the upper edge of the frame 37. In Fig. 2 the frame is shown as swung downwardly upon the shaft 33, being therefore in inverted position. In Fig. 3 the frame is shown in its operative position, but partly in section.

The auxiliary frame 37 has at its right-hand end a stud shaft 36 upon which is mounted a large pinion 35 arranged to mesh with the pinion 34 on the shaft 33 when the auxiliary frame is in operative position. In the upper part of the auxiliary frame is formed a stationary boss 42 providing bearings for the short shaft 43 carrying a small pinion 41 which meshes at all times with the large pinion 35. At its inner end the shaft 43 has a universal connection 33 with the shaft 45 of the small roll 12. The shaft 45 is journalled in a bearing piece 46 which is pivotally mounted to swing vertically upon the inner face of the auxiliary frame about the axis of a stud 47 which projects into the frame 37 at a point substantially opposite to the axis of the universal joint 44. The joint is shown as broken away in Fig. 6 so that the location of the stud 47 may be seen. The bearing piece 46 is provided at its forward end with a rib 48 arranged to move vertically in guideways formed by an undercut plate 49 which is attached to the inner face of the auxiliary frame 37. To the forward end of the bearing piece 46 is pivotally attached a downwardly extending rod 50. This passes downwardly through a perforated boss 51 projecting forwardly from the frame 37 and through a sleeve 52 which bears at its upper end against the boss 51. The lower end of the rod 50 is encircled by a compression spring 53 held under adjustable tension by a knurled nut 54 threaded upon the lower end of the rod 50. The action of the spring 53 through the rod 50 is to urge the bearing piece 46 and consequently the roll 12 downwardly with a yielding pressure. The initial position of the bearing piece 46 is determined by an abutment plate 56 which is secured to the bearing piece 46 in a position to engage the upper edge of the undercut plate 49 upon the frame 37.

The bearing piece 46 and the roll 12 may be lifted by a pin 57 which engages the bearing piece 46 at its upper end and rests upon the forward end of a treadle lever 58 pivotally mounted in the lower portion of the auxiliary frame 37. The upper end of a treadle rod 55 is shown in Fig. 6 and by depressing this the forward end of the treadle lever is lifted and the bearing piece 46 with the shaft 45 and roll 12 are swung upwardly against the compression of the spring 53. An angular guard 59 is secured to the forward bearing of the shaft 45 and disposed adjacent to the roll 12 in position to engage the inner face of the reinforced insole and prevent the upper rib from contacting with the machine.

As will be clear from the foregoing description the side frame 37 may be swung downwardly about the axis of the stationary shaft 33 when access to the interior of the machine is desired, and when this occurs the large pinion 35 rolls upon the small pinion 34 on the shaft 33 without being disengaged therefrom. Threaded into the upper portion of the side frame adjacent to the clamping screw 39 is an adjusting screw 60 which abuts against the main frame of the machine and, in cooperation with the clamping screw, determines the operative position of the side frame 37 and consequently of the small roll 12. By manipulating these two screws therefore, the position of the roll 12 may be regulated and adjusted transversely or laterally with reference to the large roll 10. This provision for adjustment is important, since for best results when operating at high speed, an accurate setting of the operating instrumentalities is extremely desirable. In the transverse adjustment of the auxiliary frame 37 the shaft 45, the roll 12 and the mechanism by which the roll 12 is yieldingly pressed toward the outside roll 10 are all carried together without any disturbance to the operative relation of these parts.

The external presser roll 14 is mounted to rotate about a substantially vertical journal projecting upwardly from an angular arm 64 pivotally mounted to swing about the axis of a pin 65 set in the forward end of a bracket 66 which is suspended from the shaft of the outside roll 10 as will be presently described. A vertical adjusting screw 67 threaded into a lug on the forward portion of the frame 20 engages the rear end of the horizontal limb of the arm 64 and in cooperation with a compression spring 68 supplies means for accurately adjusting the roll 14 toward or from the work which is engaged between it and the outer flat faces of the rolls 10 and 12.

The outer roll 10 is rigidly mounted on the forward end of a horizontal shaft 70 which is journaled in bearings 71 formed in the inner or free end of a stationary but adjustable rocker member 72. At its outer end the rocker member is provided with bearings 73 by which it is pivotally mounted in the rear portion of the frame 20. The left-hand bearing 73 swings upon a journal pin 74 and the right-hand bearing 73 swings upon a horizontal shaft 75 which itself is journaled in bearings 76 formed in the rear portion of the frame 20. It will be understood that the journal pin 74 and the shaft 75 are arranged in alignment with each other. At its outer end the shaft 75 carries a pulley 77 by which it is independently driven by a belt from any suitable source of power. At its inner end the shaft 75 carries a small pinion 78 and this is arranged to mesh with a larger pinion 79 mounted upon a stub shaft 80 which projects inwardly from the right-hand limb of the rocker member 72 as seen in Fig. 3. The pinion 79 in turn meshes with an intermediate pinion 81 mounted on a second stub shaft 82 and the pinion 81 meshes with a pinion 83 keyed to the shaft 70. As shown in Fig. 7 the rocker member 72 extends inwardly beneath the shaft 23 and is spaced sufficiently below it to afford ample clearance for vertical adjustment of the shaft 70 and the outside forming roll 10 carried thereby.

We have thus followed through the driving train of the outer roll 10 from the driving pulley 77 and seen that this roll may be driven independently of the other mechanisms of the machine at the rate of speed best adapted for its function of shaping the outside surface of the insole rib. The shaft 70 and the roll 10 may be adjusted vertically by means of a pair of adjusting screws 84 and 85 which pass downwardly from the upper portion of the frame, being provided with nuts which rest upon the upper face of the frame. The adjusting screw 84 is hooked beneath a stud projecting inwardly from the left-hand limb of the rocker member and the screw 85 bears upon the upper face of the same limb.

The bracket 66 already referred to as carrying the presser roll 14 projects downwardly from a block 94 in which is formed a bearing which engages the shaft 70 as a journal. Secured to the outer face of the block 94 is a guard member 95 which partially encircles the outer portion of the periphery of the large roll 10 thus safeguarding the fingers of the operator when work is inserted into the machine. The block 94 also carries an upstanding guard member 96 which shields the rear face of the roll 10 almost up to the operating point.

Secured to the upper left portion of the frame 20 is a shield member 97 having a downwardly extending guard projection 98 which encircles the circumference of the disk knife 16 and thus safeguards it against cutting except at the operating point. The shield 97 is provided with a socket for an abrasive stick which may be advanced from time to time as desired against the rear face of the knife disk for sharpening the latter.

The operation of the machine will be clear from the foregoing description, but may be summarized for convenience as follows. The machine as installed, is belted by three independent driving pulleys to any convenient form of factory transmission mechanism, one belt operating the knife shaft at high speed, another belt driving the step-pulley 29 and operating the small inside roll 12 through its own train of operating mechanism, and the third belt driving the pulley 77 and operating the large outside roll 10 through its operating train, contained mostly in the rocker member 72.

Assuming that the various adjustments referred to have been properly made, the operator may now depress the treadle rod 55 to lift the inside roll 12, separating it from the outside roll 10 and so facilitating the presentation of an outsole in the position indicated in Fig. 5. That is to say, the inner face of the insole is pressed against the flat outer faces of the rolls 10 and 12 by the presser roll 14 while the rib is shaped between the bevelled peripheral surfaces of the outside roll 10 and the inside roll 12. By these instrumentalities the reinforcing material 93 is tucked firmly into the inner vertex of the rib and the rib itself is compressed, consolidated and given an inward inclination. The insole is automatically fed from one end of the rib to the other by the action of the rolls 10 and 12 in clamping and advancing the rib. Meanwhile the rotary knife disk 16 is effective to trim off the reinforcing fabric flush with the upper edge of the compressed and shaped rib. After the operator has started an insole through the machine, he has nothing further to do until the completed insole is dropped out at the end of the feeding operation.

Having thus described my invention what I claim as new and desire to secure by Letters Patent of the United States is:

1. In a machine for operating on ribbed insoles, a pair of horizontal, independently driven shafts, a disk knife mounted on one of said shafts, a hollow shaft rotatable on the knife shaft, a rocker arranged to swing about the axis of the other shaft, a driven shaft carried by the rocker and provided with a rib-shaping roll, and a cooperating rib-shaping roll driven from said hollow shaft independently of the other roll and disk knife.

2. In a machine for operating on ribbed insoles, a knife and shaft mounted to rotate about a fixed axis, a hollow shaft concentric with the knife shaft, a rocker mounted below the knife shaft for adjustment toward and from the same, a rib-shaping roll having a shaft journaled in the rocker, a driving shaft disposed concentrically with respect to the axis of said rocker and having a driving connection with the roll shaft, and a second rib-shaping roll driven from said hollow shaft.

3. In a machine for operating on ribbed insoles, a frame having a rotary knife and shaft, and a rib-shaping roll mounted therein, an auxiliary frame adjustably connected to said frame and carrying a cooperating rib-shaping roll together with means for yieldingly positioning the roll in said auxiliary frame, a hollow shaft concentric with said knife shaft, and a driving train between said hollow shaft and said cooperating roll operative in all adjusted positions of said auxiliary frame and its roll.

4. A machine for operating on insoles, including in its structure a main frame having an outside rib-shaping roll mounted therein, an auxiliary frame having an inside rib-shaping roll mounted therein, gear trains for driving both rolls, means for adjusting the auxiliary frame, and releasable means carried by said auxiliary frame for holding the inside roll yieldingly in a position of pressure.

5. A machine for operating on insoles, including in its structure a frame having an outside rib-shaping roll mounted therein, an auxiliary frame movably connected to said frame and having mounted therein, as a self-contained unit, a shaft having a universal joint therein, an inside rib-shaping roll carried by the shaft, and spring means for holding the roll in a predetermined position wherein it cooperates with the outside rib-shaping roll to engage an insole rib with pressure.

6. In a machine for operating on ribbed insoles, a frame having a knife shaft mounted therein for rotation about a fixed axis, a rocker member journaled at one side of the frame and extending laterally beneath the knife shaft, a driven roll shaft mounted in the free end of the rocker member and adjustable vertically by the movement thereof, and a second roll shaft mounted vertically above said first-named roll shaft and having provision for bodily lateral adjustment.

7. In a machine for operating on ribbed insoles, a frame having a knife shaft mounted therein for rotation about a fixed axis, a rocker member journaled at one side of the frame and extending horizontally across the knife shaft and spaced therefrom, a driven shaft mounted in the free end of the rocker member and carrying an outside rib-shaping roll adjustable by movement of the rocker member, and a roll shaft having an inside rib-shaping roll disposed in cooperating relation to the outside rib-shaping roll.

8. In a machine for operating on ribbed insoles, a frame having a knife shaft journaled therein and provided with a rotary knife, a rocker member pivotally supported in one side of the frame and carrying a forming roll disposed at the side of the knife furthest from the axis of the rocker member, means for swinging the rocker member toward or from the knife shaft, and a second forming roll located adjacent to the first.

9. In a machine for operating on ribbed insoles, a frame having a knife shaft journaled therein and provided with a rotary knife, a driven shaft concentric with the knife shaft, a rocker pivotally supported upon one side of the frame and carrying a forming roll disposed beside the knife, a second forming roll located above the first, and a gear train between said concentric shaft and said latter forming roll.

10. In a machine for operating on ribbed insoles, a main frame having mounted therein a rotary work table, a knife shaft and a hollow shaft concentric with the knife shaft, an auxiliary frame detachably secured to the main frame and having a driven shaft journaled therein which is provided with a forming roll, a stop carried by said auxiliary frame, spring means for positioning said driven shaft with reference to said stop, and a driving train between said shaft and the hollow shaft in the main frame.

11. A lip setting machine having a main frame, a rotary knife and rib-forming roll mounted therein, an auxiliary frame pivotally mounted on the main frame for movement at right angles to the axis of the knife shaft, a bearing piece movably mounted on the auxiliary frame, a driven roll shaft journaled in said bearing piece, spring means in the auxiliary frame tending to maintain said roll shaft in a predetermined position, and means also mounted in said auxiliary frame whereby the operator may temporarily displace said roll shaft.

ANDREW R. RIDDERSTROM.